United States Patent

[11] 3,573,554

[72] Inventor Donald J. Theobald
La Jolla, Calif.
[21] Appl. No. 838,129
[22] Filed July 1, 1969
[45] Patented Apr. 6, 1971
[73] Assignee The United States of America as represented by the Secretary of the Navy

[54] MULTIPLE POWER SUPPLY OVERVOLTAGE AND INTERLOCK CONTROLLED CUTOFF
5 Claims, 4 Drawing Figs.

[52] U.S. Cl. .......... 317/31, 317/27, 317/33, 317/46, 317/22
[51] Int. Cl. .......... H02h 3/24, H02h 3/20
[50] Field of Search .......... 317/31, 33, 27, 26, 46, 22; 307/93, 130, 18, 24, 29

[56] References Cited
UNITED STATES PATENTS
3,048,718 8/1962 Starzec .......... 307/93
3,225,257 12/1965 Fegley .......... 317/46X

*Primary Examiner*—J. D. Miller
*Assistant Examiner*—Harvey Fendelman
*Attorneys*—George J. Rubens, John W. McLaren, R. S. Sciascia, R. K. MacNeil and Thomas M. Phillips

ABSTRACT: In plural power circuits, all circuits are shut down in case of abnormal high or low voltage on any one of the several circuits. Over and under voltage sensors are connected across the circuits and through OR circuits to on-off switches in each power circuit.

INVENTOR
DONALD J. THEOBALD
BY
[signature]
[signature]
ATTORNEYS

INVENTOR.
DONALD J. THEOBALD
BY F. L. Styner
George J. Rubens
ATTORNEYS

INVENTOR.
DONALD J. THEOBALD
BY
ATTORNEYS

MULTIPLE POWER SUPPLY OVERVOLTAGE AND INTERLOCK CONTROLLED CUTOFF

STATEMENT OF GOVERNMENT INTEREST

The invention described herein may be manufactured and used by or for the Government of the United States of America for governmental purposes without the payment of any royalties thereon or therefor.

BACKGROUND OF THE INVENTION

In regulated power systems it is well known that abnormal voltages can be sensed either at the source or at the load and fed forwardly or backwardly to readjust or shutoff the power circuits. Such regulation is difficult in cases where a number of power circuits must be operated side-by-side and where, desirably, all must be shutdown in case of abnormality in any one of the circuits.

In addition some regulated power supplied are designed with what is referred to as an electronic "crowbar" that shorts the output in an overvoltage condition. Unfortunately the electronic crowbar will not reset unless the primary power source is shutoff.

SUMMARY OF THE INVENTION

The emitter-base of a silicon-controlled rectifier is connected as a switch in series with each power circuit. The control electrode, usually the base, of each switch is connected to the output of a logical OR circuit. To each input of the OR circuits are connected several overvoltage and undervoltage sensors. When the voltage abnormality is removed the power circuits are immediately reset and operative.

Other features and objects of this invention will become apparent to those skilled in the art by referring to the preferred embodiments described in the following specification and shown in the accompanying drawing in which.

Figure 1:
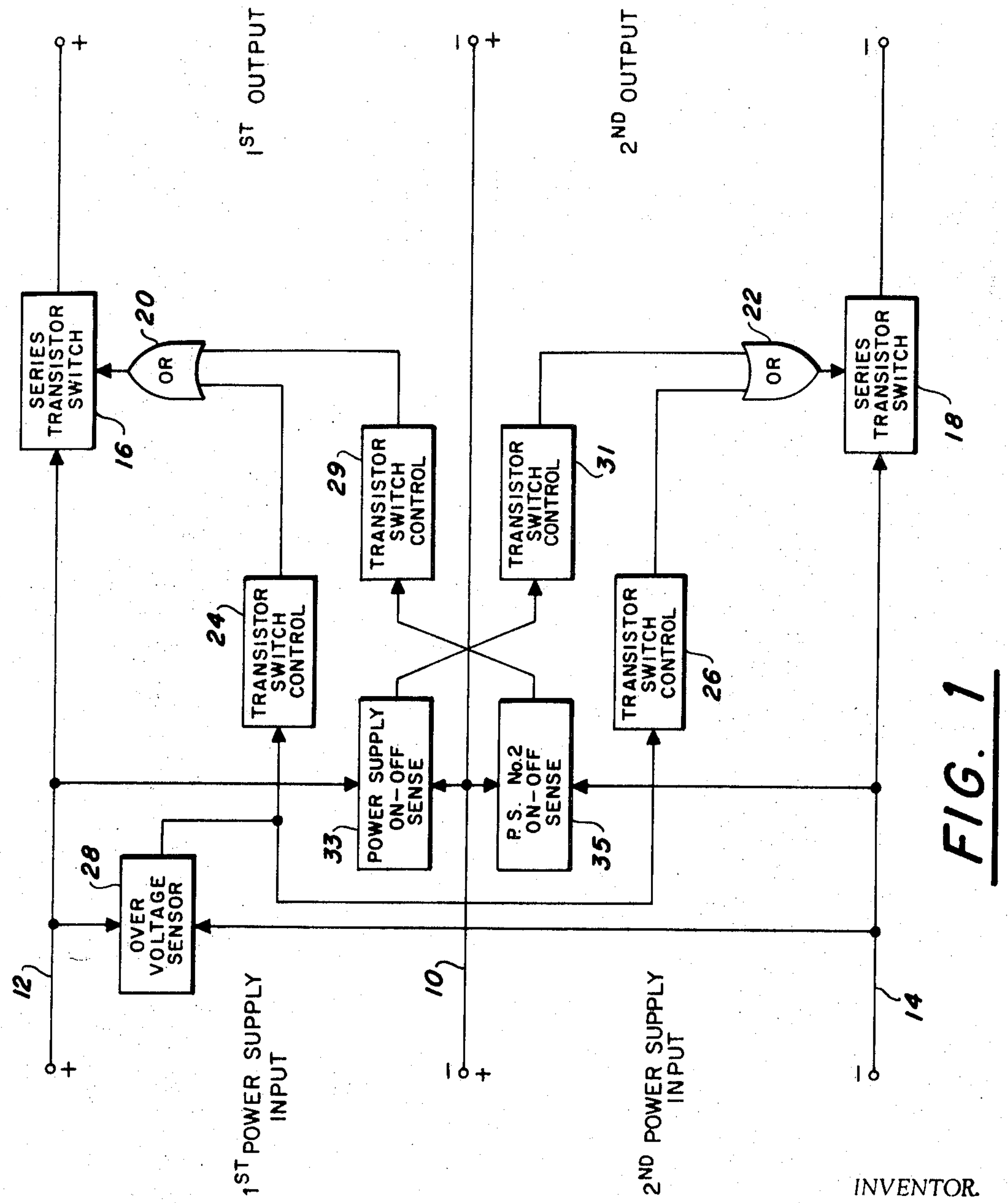
FIG. 1 is a block diagram of the principal element for protecting two parallel power circuits, according to this invention.

In FIG. 1 is show two side-by-side power circuits each having a common conductor 10 held at a reference potential, for example, at ground voltage. Conductors 12 and 14 then comprise the ungrounded sides of each circuit. Transistor switches 16 and 18 are connected in series, respectively, with power circuits 12 and 14. The control electrode of each transistor switch is connected to the output of the OR circuits 20 and 22. Each OR circuit has two input circuits, in the specific example of FIG. 1. One input circuit of each gate is connected to an overvoltage sensor 28 while the other input circuit is connected to an undervoltage sensor, to be described. The overvoltage sensor 28 is connected between the two power circuits 12 and 14 so that if 12 became abnormally high in a positive direction or 14 became abnormally high in a negative direction the sensor 28 will produce an output or alarm voltage. The alarm voltage is applied to each of the transistor switch control devices 24 and 26, and hence through each of the OR circuits to the series transistor switches 16 and 18 so that the entire system is shutdown. According to an important feature of this invention when the overvoltage at 28 is removed the alarm signal disappears and the series transistor switches are restored to normal conduction.

If, now, an abnormal low voltage occurs on either of the power circuits, the other power circuit will be opened. That is, in case either primary power source fails or in case either load circuit is short circuited or becomes excessive it is usually desirable or necessary that the entire system be disconnected. To this end the alternative inputs to the OR circuits are connected, respectively, to the transistor switch controls 29 and 31. A low voltage on buss 12 is sensed by the on-off sensor 33 and the alarm voltage is applied through switch control 31 and OR gate 22 to switch 18. Likewise, low voltage on buss bar 14 produces an alarm voltage which is applied through switch control 29 and gate 20 to disable series transistor switch 16.

Figure 3:
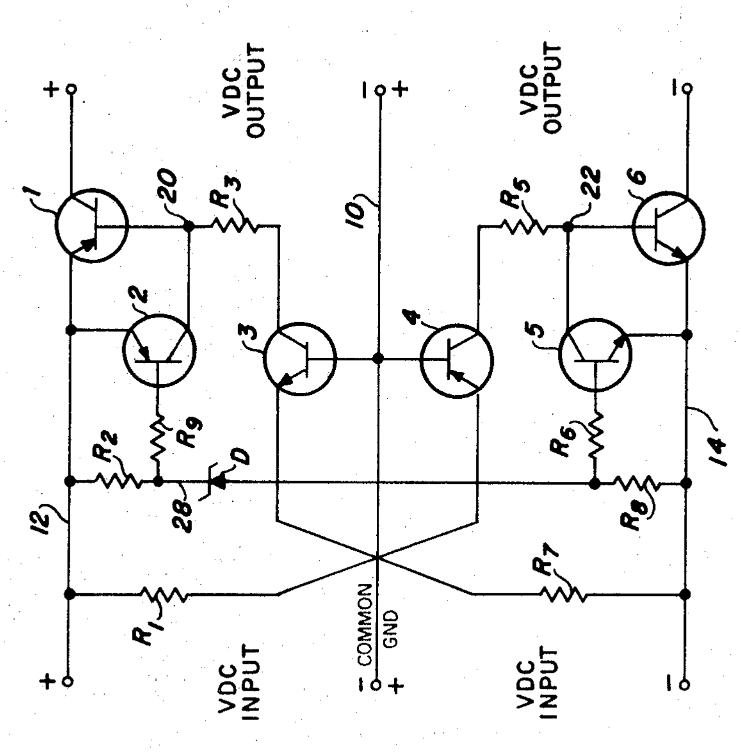
FIG. 3 is a schematic circuit diagram of the embodiment of the invention of FIG. 1.

The circuit diagram of FIG. 3 shows specifically one embodiment of the system outlined in FIG. 1. The overvoltage circuit 28 comprises essentially the Zener diode D connected between the two buss bars 12 and 14. The diode is connected in series with resistors R2 and R8 the values of the resistors being chosen to establish a predetermined threshold at which the breakdown of the diode will occur. When current flows, the voltage drop across R2 is applied to the base of transistor 2 through resistor R9. Likewise the drop across resistor R8 is applied to the base of transistor 5 through resistor R6. With the polarities indicated, and with transistors 2 and 5 of the PNP and NPN types these transistors will normally remain off and will saturate only when negative and positive voltages, respectively, are applied to the base electrodes. Saturation of transistor 2 effectively connects together the emitter and the base of transistor switch 1 and opens the power circuit of buss 12.

A blocking voltage can also be applied to the base of transistor 1, at point 20, in response to an undervoltage on buss bar 14. In this case buss bar 14 goes from normal negative toward zero which stops emitter-collector current of transistor 3 and permits point 20 to go positive. Likewise if positive buss 12 goes negative or toward ground, current is interrupted through transistor switch control 4 permitting point 22 to move in a negative direction, interrupting power switch 6, so we now have a system for interrupting both power circuits when either circuits becomes abnormally high, and for interrupting the other circuit when one circuit has an abnormally low voltage.

Figure 4:
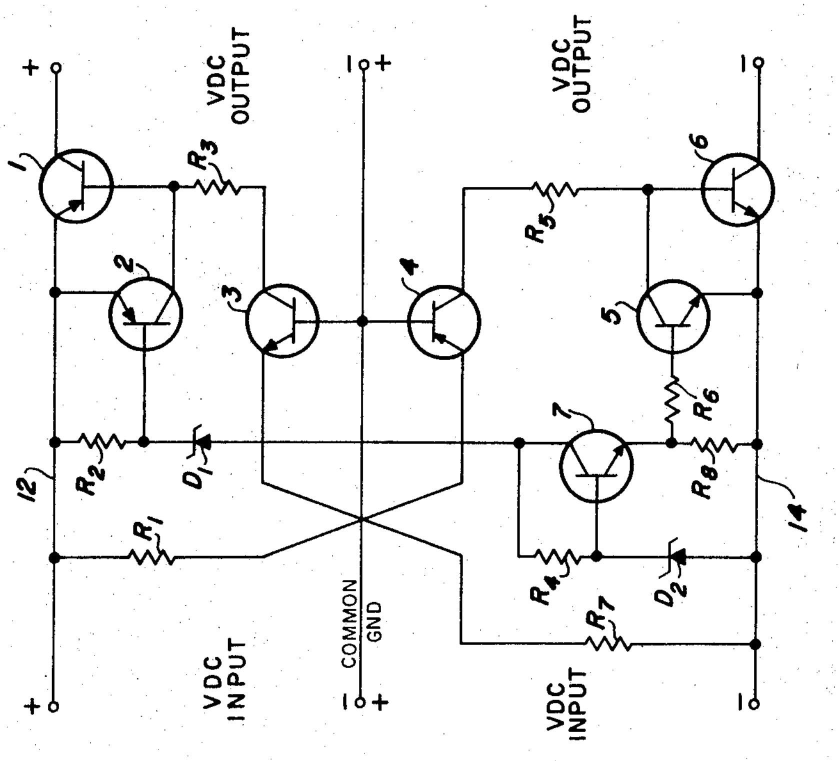
FIG. 4 is a schematic circuit diagram of a modification of the circuits of FIG. 3.

FIG. 4 shows a refinement of the system of FIG. 3 for more precisely controlling the threshold voltage over which the overvoltage sensor will respond. The collector-emitter of transistor 7 is connected in series with Zener diode D1, the base and the emitter of the transistor being connected to the buss bar through diode D2, and resistance R8.

In FIG. 4 transistor 2 will control transistor 1 and transistor 5 will control transistor 6, just as in FIG. 3. When an overvoltage occurs and diode D, breaks down, resistor R6 will limit to a safe valve the base to emitter current of transistor 5. Resistors R4, R8, and diode $D_2$ with transistor 7 comprise a constant current source for diode $D_1$. This constant current will develop the alarm voltage across R2 and R8 during an overvoltage condition. As stated transistor 2 and 5 saturate so as to cutoff transistors 1 and 6. It should be noted that the upper and lower buss bars 12 and 14 are of opposite polarity with reference to the common or ground 10.

Figure 2:
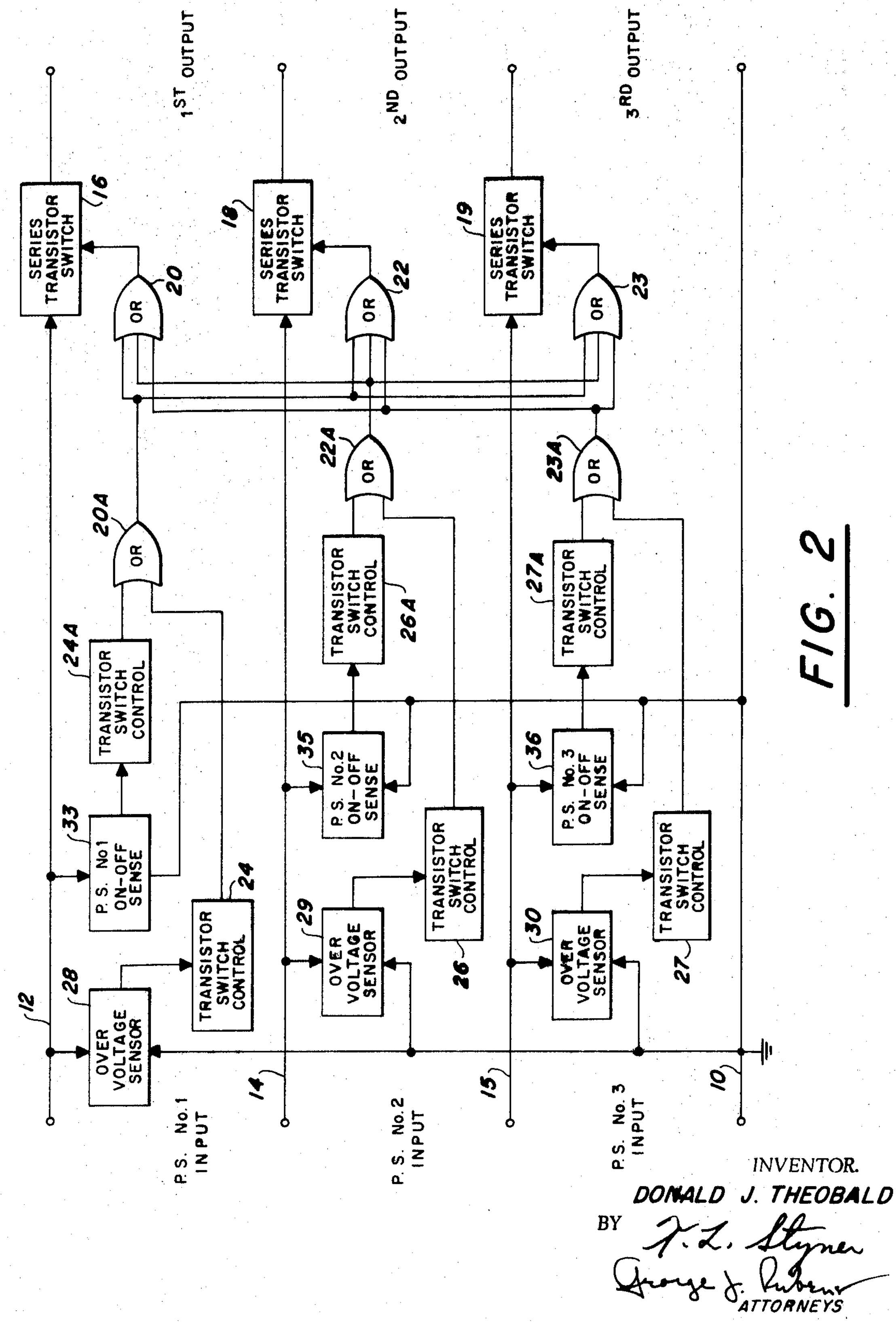
FIG. 2 is a block diagram of the principal elements for protecting three parallel circuits.

Any number of side-by-side interlocked power circuits can be expanded from the two shown in FIG. 1. Three parallel circuits are shown in FIG. 2. Series transistor switches 16, 18, and 19 are respectively coupled in series with the three buss bars 12, 14, and 15. The grounded buss 10 is common to all circuits. The logical OR circuits in this case comprise the OR gates 20, 22, and 23 with three inputs each. Each of the three inputs are connected in parallel and to the output of one or the double-input OR gates 20A, 22A and 23A which in turn are connected to the overvoltage and the undervoltage sensors as described above. Overvoltage sensors 28, 29, and 30 operate through transistor switch controls 24, 26, and 27 to one input of the OR gate 20A, 22A, and 23A. The on-off sensors 33, 35, and 36 produce an alarm voltage when any one of the three buss bars 12, 14, and 15 drop with respect to the ground buss. The alarm voltage is applied to the OR gates 20A, 22A, or 23A through the switch control devices 24A, 26A, and 27A. Again it is pointed out that an overvoltage or an undervoltage on any one of the plural power circuits interrupts all of the circuits. Yet when the abnormality is removed the series transistor switches are automatically closed and operation resumes.

Obviously many modifications and variations of the present invention are possible in the light of the above teachings. It is therefore to be understood that within the scope of the appended claims the invention may be practiced otherwise than as specifically described.

I claim:

1. In combination in a multiple circuit power supply;

a plurality of separate parallel power circuits;

a plurality of transistor switches, the collector-emitter paths of said switches being connected, respectively; in series in said power circuits;

a plurality of logical OR circuits, each OR circuit having a plurality of input terminals, and an output terminal, each output terminal being connected to the control electrode of one of said transistor switches so that each switch may respond to any one of a plurality of separate alarm signals;

an overvoltage sensor connected between points of different potential in said power circuit for sensing an abnormal high voltage, said sensor being connected to one input of each of said OR circuits for disabling all power circuits in case of an overvoltage; and a series of undervoltage sensors connected, respectively, across said power circuits, and means for coupling the output of each sensor of said series to another of said inputs, of each of said OR circuits.

2. In combination in a multiple circuit power supply;

a pair of separate parallel power circuits;

a plurality of transistor switches, the collector-emitter paths of said switches being connected, respectively, in series in said power circuits;

a plurality of logical OR circuits, each OR circuit having a plurality of input terminals, and an output terminal, each output terminal being connected to the control electrode of one of said transistor switches so that each switch may respond to any one of a plurality of separate alarm signals;

an overvoltage sensor connected between points of different potential in said power circuits for sensing an abnormal high voltage, said sensor being connected to one input of each of said OR circuits for disabling all power circuits in case of an overvoltage; and an undervoltage sensor connected across each of said power circuits, and means for coupling the output of each sensor to another of said inputs of the OR circuit associated with the other power circuit.

3. In the combination defined in claim 2;

said overvoltage sensor comprising a diode connected between dissimilar voltage points in said power circuits;

a plurality of resistors in series with said diode to generate on alarm voltage when said diode conducts; and means for coupling the voltage across said resistors to said one input of each OR gate to disable all series transistor switches in case of an overvoltage.

4. The combination defined in claim 2 further comprising a constant voltage source connected in series with said diode to accurately establish a threshold voltage which said overvoltage must exceed to operate said diode.

5. In the combination defined in claim 2, two of said power circuits comprising busses of operating, respectively, above and below reference ground;

said overvoltage sensor comprising a Zener diode with two resistors connected in series on either side of said diode and across said busses;

a switch control means connected across the emitter-base of each of said transistor switches;

one end of each of said resistors being connected to said switch control for disabling the associated transistor switches when said diode conducts.